Oct. 13, 1964     I. ERLICHMAN     3,152,529
PHOTOGRAPHIC APPARATUS
Filed Aug. 10, 1960     7 Sheets-Sheet 1
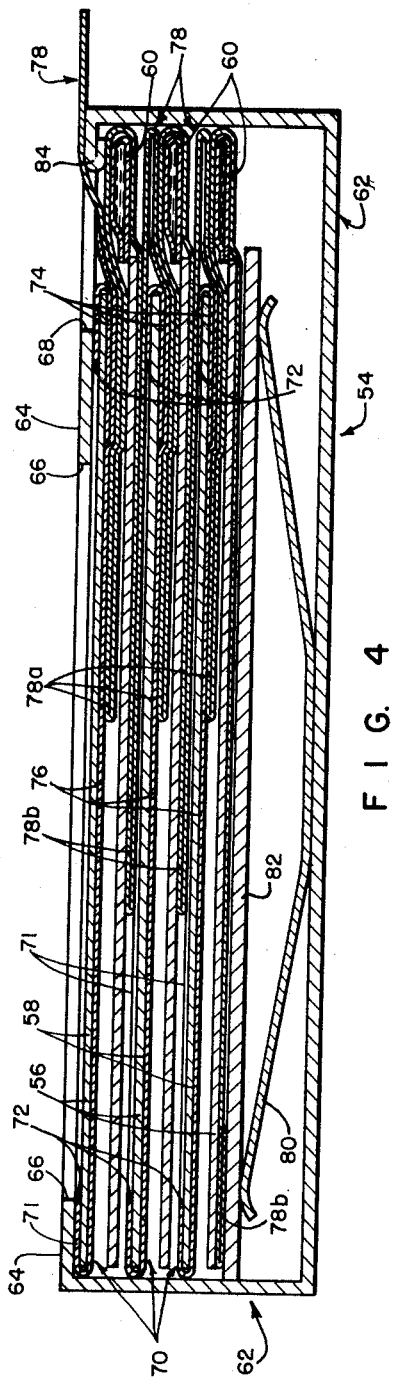
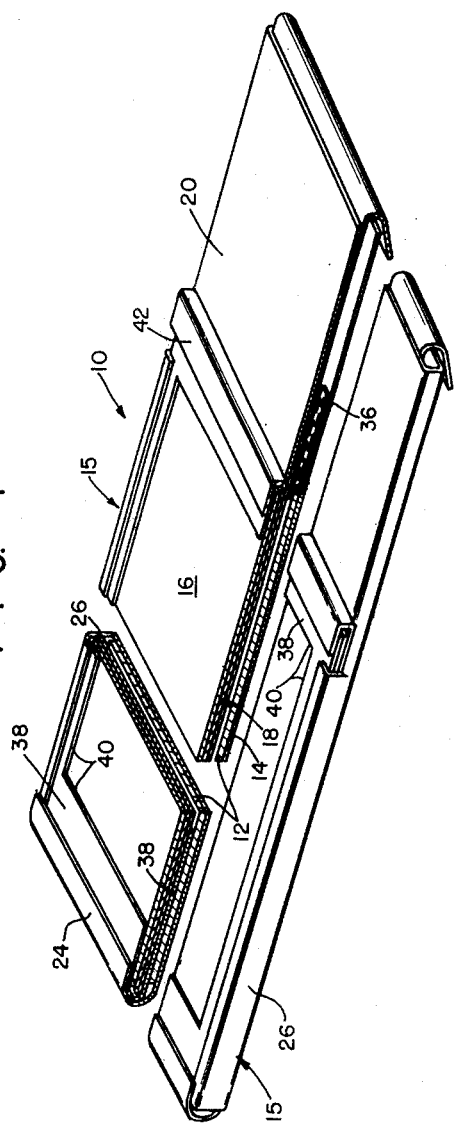
INVENTOR
Irving Erlichman
BY
Brown and Mikulka
and
Robert E. Corb
ATTORNEYS

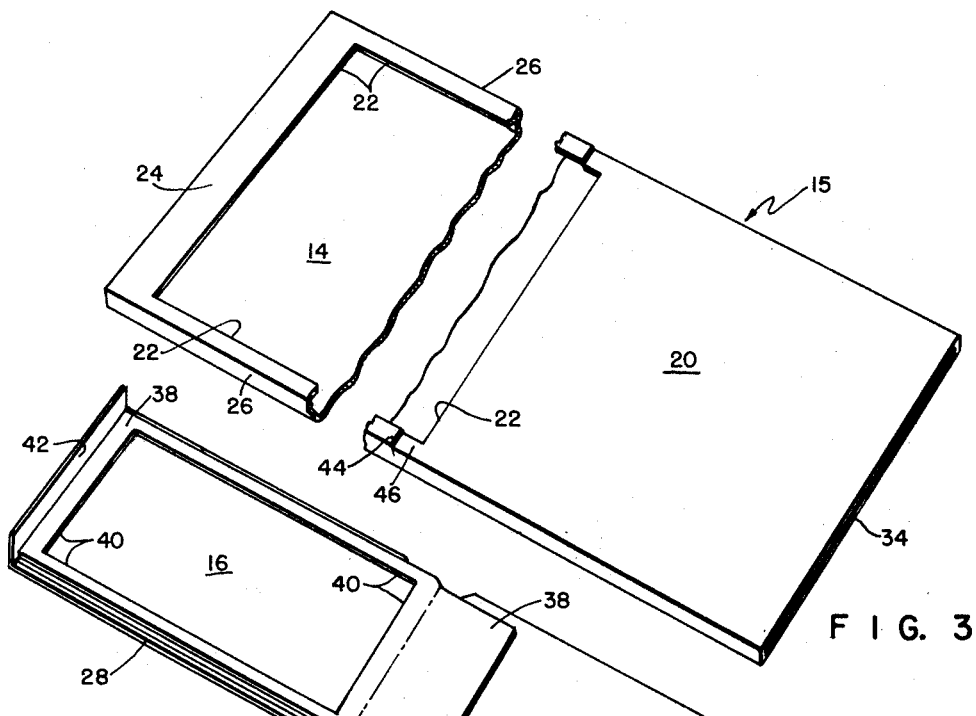
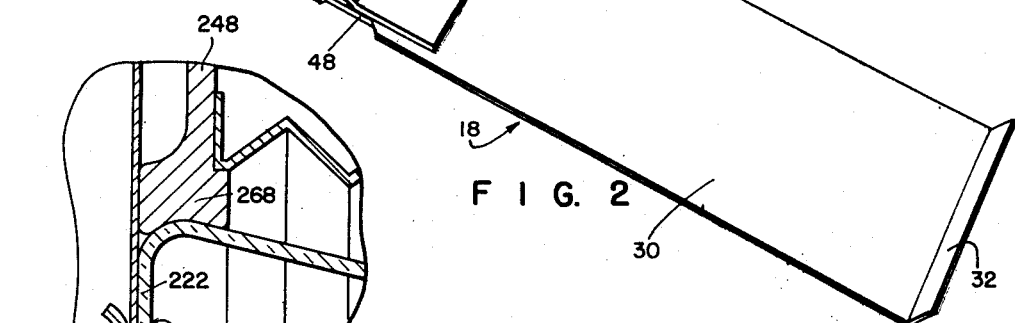
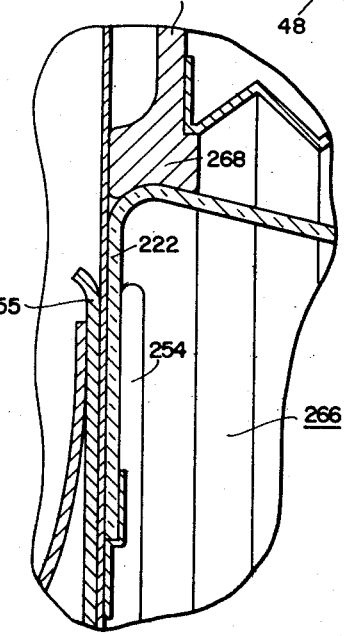

Oct. 13, 1964    I. ERLICHMAN    3,152,529
PHOTOGRAPHIC APPARATUS

Filed Aug. 10, 1960    7 Sheets-Sheet 5

INVENTOR.
Irving Erlichman
BY Brown and Mikulka
Robert L. Cort
ATTORNEYS

Oct. 13, 1964   I. ERLICHMAN   3,152,529
PHOTOGRAPHIC APPARATUS
Filed Aug. 10, 1960

United States Patent Office 3,152,529
Patented Oct. 13, 1964

3,152,529
PHOTOGRAPHIC APPARATUS
Irving Erlichman, Natick, Mass., assignor to Polaroid Corporation, Cambridge, Mass., a corporation of Delaware
Filed Aug. 10, 1960, Ser. No. 48,666
10 Claims. (Cl. 95—13)

This invention relates to photographic apparatus and, more particularly, to novel apparatus for exposing and thereafter processing photosensitive materials.

Photographic apparatus of the type with which the present invention is concerned generally includes means for exposing the photosensitive layer of a photosensitive element, superposing a second element with the exposed photosensitive element and distributing a fluid processing agent between the superposed elements to effect the processing of the exposed photosensitive layer located between the elements, preferably to produce a transfer image in an image-receiving layer carried on one of the elements between the outer surfaces thereof. In the particular type of apparatus comprehended by the present invention, distribution of the fluid processing agent is effected, following exposure of the photosensitive element, by moving the elements in superposition relative to and between a pair of juxtaposed pressure-applying members comprising the apparatus in which exposure is made. The processing of the photosensitive element is such as to require the superpositioning of predetermined surfaces of the two elements and heretofore, for this purpose, the elements have been connected and arranged in such a way that the predetermined surfaces are superpositioned merely by drawing the two elements relative to and between the pressure-applying members. The elements heretofore have been arranged initially with at least portions of the two surfaces in superposition; or the elements have been connected by leader sheets or by carrier sheets on which they are mounted, in which case the leader sheets or carrier sheets are coupled and arranged, either with the appropriate surfaces in superposition, or so connected that such surfaces will be superposed when the leader sheets or carrier sheets are moved between the pressure-applying members. Thus the relationship between the surfaces of the two elements and the leader or carrier sheets, when superposed, could be considered to be essentially fixed to the extent that superpositioning of two predetermined surfaces was assured by merely drawing or pulling the two elements between a pair of pressure-applying members.

An object of the invention is: to provide photographic apparatus of the type described for use with photographic film assemblages, each comprising photosensitive and second elements initially connected and arranged for exposure in such a way as to require drawing of said elements between a pair of pressure-applying members and rotation of one of the elements relative to the other through 180° about an axis lying in said one element and extending at right angles to the direction of movement of said one element between said pressure-applying members.

Another object of the invention is: to provide, in photographic apparatus of the type described, means for engaging a photosensitive element mounted at an edge on a carrier sheet and pivoting said photosensitive element through 180° about said edge relative to said carrier sheet.

A further object of the invention is: to provide photographic apparatus of the type described for use with a photographic film assemblage including photosensitive and second elements arranged in superposition with first surfaces of the elements located in face-to-face relation, and including means for separating and then resuperposing the elements with a second surface of one of the elements in face-to-face relation with the first surface of the other element.

Still another object of the invention is to provide photographic apparatus of the type described in the form of a camera including means for exposing and processing a photographic film assemblage of the above type.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a perspective view, partially in section, of a photographic film unit designed for use with the apparatus of the invention;

FIGS. 2 and 3 are perspective views of components of the film unit of FIGURE 1;

FIG. 4 is a sectional view of another form of photographic film assemblage, the section being taken substantially midway between the sides of the film assemblage;

FIG. 12 is a fragmentary view showing in detail a portion of the camera of FIG. 11.

Figure 9:
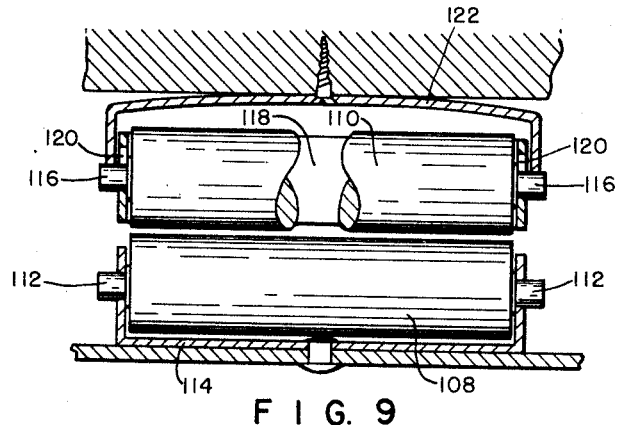
FIG. 9 is a sectional view taken substantially along the line 9—9 of FIG. 6.

The photographic apparatus of the invention may take the form of a camera for use with one of two basic types of film assemblages adapted to be exposed and processed in the camera. One type of film assemblage is similar to the film assemblage shown in U.S. Patent No. 2,579,587, issued December 25, 1951 to Edwin H. Land and comprises two elongated strips, one including a succession of photosensitive elements or exposure frames adapted to be exposed in the camera and the other strip, including a succession of second or print-receiving elements (or areas) which are superposed with the photosensitive elements following exposure thereof. The two strips are initially provided as separate rolls and are joined to one another at their leading end sections with the appropriate sides of the two strips in facing relation. The processing fluid is carried in a succession of rupturable containers mounted on one of the strips and is spread between the facing surfaces of the two strips. Cameras designed for use with this type of film assemblage (see for example U.S. Patent No. 2,455,111, issued November 30, 1948 in the name of Joseph F. Carbone et al.), include means for positioning the photosensitive strip, or photosensitive elements mounted on a carrier strip, for exposure with the surface of the strip or photosenstive elements against which the fluid is to be spread facing the exposure means (lens) of the camera. It may be desirable (for reasons which will appear hereinafter) while employing this basic form of camera and film assemblage, to expose the surface of each photosensitive element which is opposite the surface of each element against which the processing fluid is spread. This is made possible by the apparatus and the film assemblages comprising the present invention.

The other basic type of film assemblage takes the form of a film unit or a film pack or magazine comprising a plurality of individual film units. Each film unit includes a photosensitive element, a second element which is superposed with the photosensitive element following exposure thereof and for processing; and a rupturable container of processing fluid arranged to release its contents between the superposed photosensitive and second elements following exposure of the photosensitive element and superpositioning of the elements. In the film units of the invention, the photosensitive and second elements of each film unit are arranged with first surfaces thereof in superposition and are connected to one another in such a way that one of the elements can be pivoted through 180° with respect to the other element to bring the opposite surface of the pivoted element into facing relation with the first surface of the other element. This makes it possible, for example, to arrange a plurality of film units in stacked relation in a magazine with the photosensitive and second elements in alternating relation and the second element of each film unit arranged outermost so as to prevent exposure of the photosensitive element of each film unit. The second element of each film unit is separated from the photosensitive element to permit the latter to be exposed and, during this separation, the second element is rotated through 180° with respect to the photosensitive element prior to being resuperposed therewith.

In the preferred form of the film assemblage, each photosensitive element comprises a photosensitive silver halide emulsion adapted to be exposed for producing a developable latent image therein. The second element (with which the photosensitive element is superposed during processing) may merely aid in the distribution of the fluid processing composition on the photosensitive element, or it may comprise an image-receptive element or support for a transfer image produced as a result of the development of a latent image in the exposed silver halide emulsion. The fluid processing composition preferably includes a silver halide developer and, when distributed in a thin layer between the photosensitive and image-receptive elements, is adapted to the formation of an image by the transfer of image-forming substances resulting from the development of the latent image in the silver halide. The photosensitive element, second element and fluid processing composition comprise a film unit which is processed preferably to effect the formation of a positive silver transfer print; and further examples of materials useful in such film units are described in U.S. Patents Nos. 2,543,181, issued February 27, 1951 and 2,662,822, issued December 15, 1953, both in the name of Edwin H. Land.

One form of film unit is shown at 10 in FIGS. 1 through 3 of the drawings and is adapted to be employed individually, or it may comprise one of an assemblage of film units. Film unit 10 includes a photosensitive sheet 12 comprising a silver halide emulsion layer on a suitable support, such as paper, plastic or any of the conventional film base materials. Photosensitive sheet 12 is mounted on an elongated support sheet 14 which is slightly wider and substantially longer than photosensitive sheet 12 and comprises the rear panel of an envelope 15, shown in FIGS. 1 and 2. Envelope 15, including support sheet 14, preferably comprises a material such as black paper, metal foil or the like, which is opaque to light actinic to the photosensitive sheet, whereby the support sheet provides an outer opaque layer for the film unit. A second or print-receiving sheet 16, generally coextensive with the photosensitive sheet, is provided secured to second support sheet 18 (see FIGS. 1 and 3), the latter also being opaque to actinic light and substantially longer (by approximately the length of said second sheet) than support sheet 14.

Envelope 15 comprises a forward panel 20 having a generally rectangular aperture 22 formed therein. Aperture 22 is located toward the trailing end of the envelope and is bounded at the trailing end of the envelope by trailing end section 24 of forward panel 20. The forward panel also includes lateral marginal sections 26 at the sides of aperture 22. Photosensitive sheet 12 is mounted within the envelope on the portion of support sheet 14 nearest the trailing end of the support sheet in alignment with aperture 22, with the photosensitive layer of the photosensitive sheet facing the aperture.

Second support sheet 18 includes a first intermediate section 28, at least equal in length to the second sheet 16, for mounting second sheet 16. The width of section 28 is approximately equal to that of support sheet 14 so that the lateral margins of first intermediate section 28 project beyond the lateral margins of second sheet 16. Second support sheet 18 includes a second intermediate section 30 substantially longer than section 28 and a folded leading end section 32. Second intermediate section 30 and leading end section 32 of the second support sheet are approximately equal in width to support sheet 14.

In the assembled form of the film unit shown in FIG. 1, first intermediate section 28 of second support sheet 18 is folded toward the leading end of the film unit so that it lies against intermediate section 30 with second sheet 16 disposed outermost. Second intermediate section 30 is superposed with photosensitive sheet 12, and the lateral margins of first and second intermediate sections 28 and 30 are engaged within envelope 15 between lateral marginal sections 26 and support sheet 14, the envelope thereby retaining the film unit in its assembled form. The leading end of second sheet 16, that is, the end thereof in the region of the fold in second support sheet 18 and located adjacent the trailing end of the film unit, is retained in the pocket formed by trailing end marginal section 24 and support sheet 14. Envelope 15 is provided with an opening 34 at its leading end and second intermediate section 30 is positioned within the envelope between forward panel 20 and support sheet 14 with leading end section 32 projecting through opening 34 to provide a leader for manipulating the film unit in a manner to be described hereinafter. The envelope and second support sheet 18 cooperate to provide a lighttight enclosure for photosensitive sheet 12, preventing light from entering between first and second intermediate sections 28 and 30 of second support sheet 18 and around the leading end of photosensitive sheet 12.

Film unit 10 includes a quantity of a fluid processing composition provided in a rupturable container 36 secured to support sheet 14 adjacent the leading end of photosensitive sheet 12 between sheet 14 and forward panel 20. Container 36 comprises a rectangular blank of a sheet material, for example a multi-ply material which is impervious to air and the fluid processing composition. The blank is folded longitudinally and its end and longitudinal margins are sealed together to form a cavity for containing the processing fluid. The longitudinal edge seal of the container is weaker than the end seals, is directed toward the photosensitive sheet (and the trailing end of the film unit) and is adapted to become unsealed in response to the application of compressive pressure to the container, for providing a mouth through which the contents of the container are released or discharged substantially unidirectionally.

Processing of the film unit, following exposure of the photosensitive sheet, is effected by superposing second sheet 16 with the photosensitive sheet and moving the two sheets and the container, commencing with the container, between a pair of pressure-applying members for rupturing the container, causing its contents to be discharged between the sheets and for distributing the fluid processing composition in a thin layer therebetween. As a means for controlling the thickness of the layer of processing fluid and for defining the area between the sheets in which processing and formation of a transfer image occur, there is provided a mask sheet 38 secured to print-receiving sheet 16 along the margins and at the ends of the print-receiving sheet, and having a generally rectangular aperture 40 defining the area of the print-receiving sheet in which the positive print is formed. In the embodiment of film unit 10 shown, print-receiving sheet 16 is secured to mask sheet 38 and the leading end of the mask sheet is secured to second intermediate section 30 of second support sheet 18. Container 36 is preferably so positioned that the longitudinal marginal portions of the container comprising the sides of the discharge mouth extend between the leading ends of the photosensitive sheet and the mask sheet in order to insure discharge of the fluid contents of the container between the photosensitive and print-receiving sheets.

Figure 6:
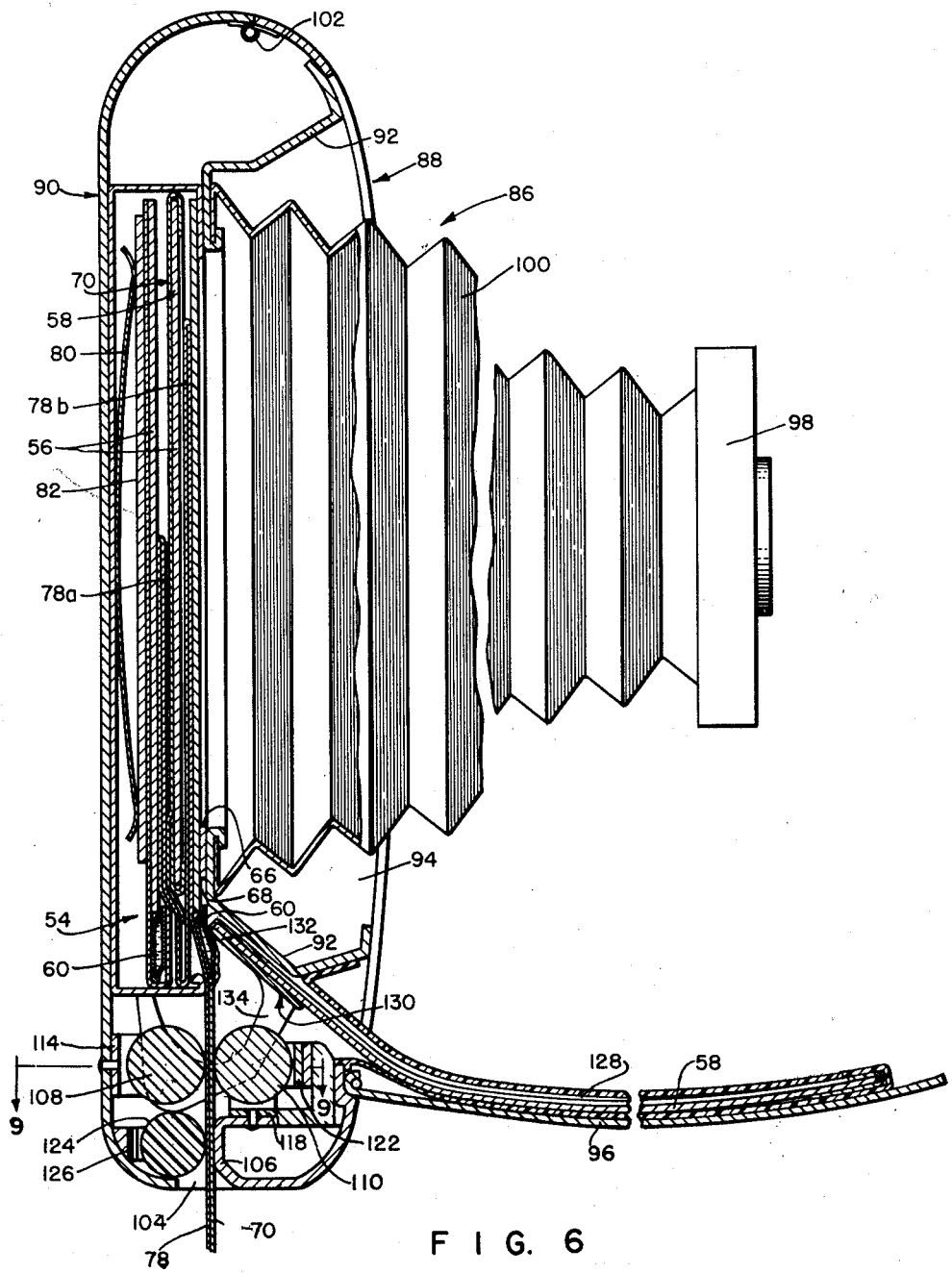
FIG. 6 is a sectional view of photographic apparatus in the form of a camera embodying the invention and designed for use with the film assemblage of FIG. 4.
Figure 7:
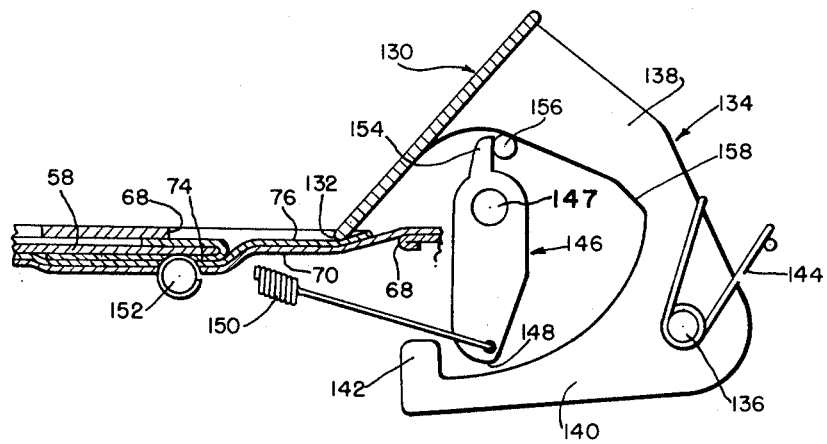
FIGS. 7 and 8 are fragmentary views, partially in section, of a portion of the operating mechanism of the camera of FIG. 6, the mechanism being illustrated in three of its operating positions.

Film unit 10 is intended to be employed in photographic apparatus, particularly a camera, similar in many respects to the camera shown in FIG. 6 of the drawings. The camera includes a pair of pressure-applying members between which the film unit is withdrawn from the camera to effect its processing. The pressure-applying members may be of any one of different constructions, a pair of juxtaposed rolls biased toward one another being the preferred form shown. Prior to processing, however, the film unit must be introduced into the camera and, prior to exposure, the print-receiving sheet must be spaced apart from the photosensitive sheet to permit exposure of the latter. Film unit 10 is particularly adapted to be employed individually, that is, a single film unit 10 is introduced into the camera, is exposed and thereafter withdrawn to effect its processing. A camera for this purpose will include an opening or passage located adjacent the pressure-applying rolls through which the film unit is both introduced into and withdrawn from the camera. Means may be provided on the camera for temporarily spacing the pressure-applying rolls apart whereby the film unit may be introduced and moved into exposure position without the application of compressive pressure to the container of the film unit. When the film unit is in exposure position, the pressure-applying rolls may then be allowed to come together and will engage the film unit between the container and the leading end of the film unit, the latter projecting from the camera.

To separate the print-receiving sheet and the trailing and intermediate sections thereof from the photosensitive sheet to permit exposure of the latter, the operator grasps the leading end section 32 of second support sheet 18, withdrawing the latter through opening 34 between support sheet 14 and forward panel 20. The camera includes a wedge-shaped device located in contact with forward panel 20 adjacent the inside of the pressure-applying rolls, adapted to engage first intermediate section 28 of second support sheet 18 and guide first intermediate section 28 and print-receiving sheet 16, mounted thereon, into a chamber in the camera as the second support sheet is withdrawn. Movement of the trailing end section of the second sheet and the print-receiving sheet into this chamber, which may be disposed at an acute angle with respect to the plane of the photosensitive sheet, is continued until the fold (shown by a broken line in FIG. 3) between first intermediate section 28 and second intermediate section 30 is engaged by the forward panel 20 at the leading edge of opening 22. To insure proper guidance of first intermediate section 28 by projection of this wedge-shaped member between it and second intermediate section 30, support sheet 18 is provided with a trailing end section 42 folded back upon itself and extending outside of forward panel 20 at the leading edge of aperture 22. This arrangement also insures that this wedge-shaped member will not project between first intermediate section 28 and the second sheet mounted thereon.

To facilitate the above-described manipulation of first intermediate section 28 and second sheet 16 mounted thereon, a slit 44 is provided in each lateral marginal section 26 adjacent the leading edge of aperture 22 and spaced therefrom toward the trailing end of the film unit so as to provide short lateral portions 46 which extend inwardly toward one another between first intermediate section 28 and second intermediate section 30. In this manner light-sealing of the film unit is effected while permitting first intermediate section 28 to extend outside of the envelope. Manipulation of the film unit is further facilitated by the provision of indentations or recesses 48 in the lateral margins of first and second intermediate sections 28 and 30 of second support sheet 18 in the region of the fold in said support sheet.

When movement of second support sheet 18 is arrested by engagement of the fold in the support sheet by forward panel 20, photosensitive sheet 12 is left uncovered and may be exposed. Second intermediate section 30 of the second support sheet projects a considerable length beyond the leading end of the envelope and may, if desired, be torn from the remainder of second support sheet 18 remaining within the envelope and attached to the second sheet. For this purpose the second intermediate section of second support sheet 18 is weakened by perforating or precutting. To process the film unit following exposure of the photosensitive sheet, the operator grasps the leading end of the film unit at the leading end of envelope 15 and draws the entire film unit between the pressure-applying members from the camera. Print-receiving sheet 16 is thereby superposed with photosensitive sheet 12 and the container, photosensitive and print-receiving sheets and the trailing end sections of the two support sheets are drawn between the pressure-applying members for discharging the fluid contents of the container between the photosensitive and second sheets and spreading the fluid therebetween.

The layer of processing fluid spread between the photosensitive and print-receiving sheets functions to laminate the two sheets together, preventing exposure of the photosensitive sheet as the film unit is withdrawn from the camera. Lateral marginal sections 26 and end marginal section 24 of envelope 15 also function to prevent light from entering between the margins of the photosensitive and print-receiving sheets. Any excess fluid processing composition that may be squeezed from between the ends of the photosensitive and second sheets is trapped in the pocket formed by end marginal section 24. The photosensitive and second sheets are permitted to remain in superposition with the layer of fluid processing composition therebetween during a predetermined processing period, at the end of which they are stripped apart, the mask preferably adhering to the photosensitive sheet. Thereafter, the print-receiving sheet, which may comprise a positive photographic print, is separated from first intermediate section 28 of second support sheet 18.

In the film unit shown and the apparatus described, separation or spacing apart of the print-receiving sheet from the negative is effected, when the negative is in exposure position, by drawing a leader or support sheet from the apparatus. During the interval between the introduction and the withdrawal of the film unit, the print-receiving sheet is pivoted, in effect, from a position in a plane substantially parallel with the photosensitive sheet, with one surface disposed adjacent the photosensitive sheet, through approximately 180° about a transverse line, to a position with its opposite surface in superposition with the photosensitive sheet.

Figure 5:
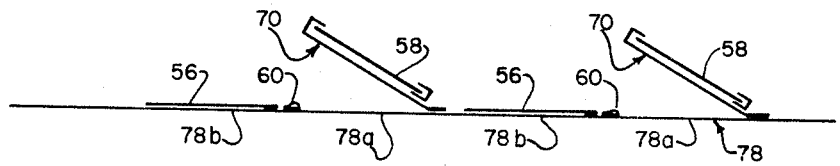
FIG. 5 is a diagrammatic showing of components of the film assemblage of FIG. 4.
Figure 13:
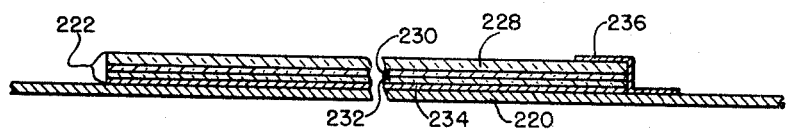
FIGS. 13 and 14 are sectional views of portions of a photographic film assemblage useful in the camera of FIG. 11, illustrating two stages of the processing of said film assemblage.
Figure 14:
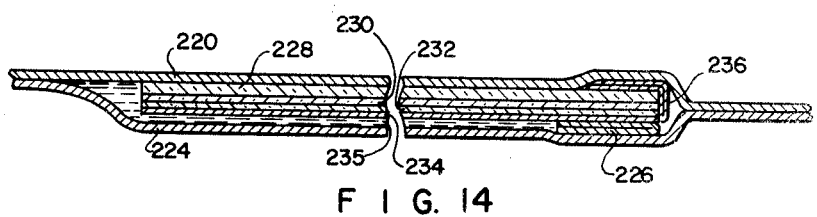

An assemblage, designated 54, of a plurality of film units, wherein the print-receiving sheets are adapted to be manipulated in a similar manner, is shown in FIGS. 4 and 5 of the drawings. Assemblage 54 comprises a plurality of film units or pairs of photosensitive and print-receiving sheets interconnected with one another and adapted to be exposed and processed in predetermined succession. The film units comprising assemblage 54 are contained in a magazine or housing which holds the assemblages in assembled form, prevents exposure of the photosensitive sheets and permits the film units to be exposed and processed, one at a time and in predetermined succession, simply and expeditiously.

Assemblage 54 comprises a plurality of photosensitive sheets 56, an equal number of second or print-receiving sheets 58 arranged alternately in stacked relation, and containers 60 of fluid processing composition, the photosensitive and print-receiving sheets and processing fluid being composed substantially as described. The assemblage comprises a housing or box 62, generally parallelepiped in shape, and including a forward wall 64 having therein an enlarged rectangular exposure aperture 66 through which photosensitive sheets 56 in the housing may be exposed. Forward wall 64 includes a second aperture 68 adjacent what is termed the leading end of the assemblage and through which the film units comprising the assemblage can be withdrawn from housing 62.

Each print-receiving sheet 58 is mounted on a support sheet 70 having a length which exceeds twice the length of the print-receiving sheet. Support sheet 70 comprises an intermediate section 71 having a rectangular aperture 72 defining the picture area and adapted to function as a mask, the print-receiving sheet being secured to the intermediate section of the support sheet at the margins of aperture 72. Support sheet 70 also includes a relatively short trailing end section 74 extending around the trailing end of the print-receiving sheet and a leading end section 76 which is somewhat longer than the print-receiving sheet and is folded around the leading end of the print-receiving sheet so as to extend behind the print-receiving sheet past the trailing end thereof. The print-receiving sheet or at least an outer layer thereof comprises a material opaque to actinic light and, preferably, the support sheet also comprises a material opaque to actinic light.

Film assemblage 54 includes an elongated carrier sheet 78, also comprising a material opaque to actinic light. Support sheets 70 are secured at their leading ends at regularly spaced intervals to carrier sheet 78, the spacing along the carrier sheet between masking sheets being at least twice the length of the print-receiving sheets and preferably longer. Each photosensitive sheet 56 is secured adjacent its leading end to carrier sheet 78 at a position immediately following the print-receiving and support sheet corresponding to said photosensitive sheet between said support sheet and the next successive support sheet. The leading end of the photosensitive sheet is spaced along the carrier sheet from its corresponding support sheet by substantially the length of leading end section 76 of the support sheet, so that, when the support sheet is unfolded and the carrier sheet is extended to its fullest, the photosensitive and print-receiving sheets will register with one another and can be superposed. A container 60 is mounted on carrier sheet 78 adjacent the leading end of each photosensitive sheet. The arrangement of photosensitive and print-receiving sheets, containers and support sheets on carrier sheet 78 is illustrated schematically in FIG. 5.

In the assembled form of the film assemblage, the print-receiving sheet of the first film unit is located adjacent forward wall 64 with intermediate section 71 of support sheet 70 disposed closest the forward wall, so that the trailing end of the print-receiving sheet is located closest the leading end of the assemblage adjacent aperture 68. The photosensitive sheet of the first film unit and the container associated therewith are located behind the first print-receiving sheet and a first portion, designated 78a, of carrier sheet 78, extending between the first support sheet and the first photosensitive sheet, comprises a fold located between the leading end 76 of the first support sheet and the first photosensitive sheet. The second print-receiving sheet (of a second film unit) and its support sheet are arranged in the same manner as the first photosensitive sheet and support sheet with a second portion, designated 78b, of carrier sheet 78, extending between the first photosensitive sheet and the second support sheet, comprising a fold located between the first photosensitive sheet and the intermediate section 71 of the second support sheet. Subsequent photosensitive sheets, support sheets, print-receiving sheets and portions of the carrier sheet are similarly arranged in succession.

Assemblage 54 includes a spring 80 and pressure plate 82 located within housing 62 behind the film units for urging them forward against forward wall 64 so that each photosensitive sheet is positioned for exposure against the forward wall across exposure aperture 66. In the assembled form shown, the first print-receiving sheet seals aperture 66 against the admission of light, preventing exposure of the photosensitive sheets.

The film assemblage 54 is intended to be loaded into, and employed in, photographic apparatus such as a camera, shown in FIG. 6 of the drawings. With the assemblage in the camera, to make an exposure the operator pulls on carrier sheet 78, thereby drawing the first print-receiving sheet from housing 62 through aperture 68, thereby leaving the first photosensitive sheet uncovered and in position for exposure. To process the first film unit, following exposure of the photosensitive sheet, the operator again pulls on the carrier sheet, drawing the first container 60 and the first photosensitive sheet (of the first film unit) from housing 62 through aperture 68 into superposition with the first print-receiving sheet, both sheets being guided and manipulated by means in the camera. To assure the withdrawal of the film units, one at a time, from the housing, a lip 84 comprising the leading edge of aperture 68 is provided, so that containers 60, attached to carrier sheet 78, extend to the leading end of the housing where they partially underlie lip 84.

Reference is now made to FIGS. 6 through 9 of the drawings wherein there is illustrated a camera, designated 86, embodying the invention and with which film assemblage 54 is adapted to be employed. Camera 86 comprises a housing having a forward section 88 and a rear section 90, the forward housing section including a forward wall having a recessed or reentrant section 92 and side walls 94. A curved door 96 is provided, pivotally mounted on the forward wall at the lower edge of reentrant section 92 for closing the recess or chamber defined by the reentrant section and, in the preferred form, for supporting a conventional lens and shutter assembly 98. A bellows 100 is provided for connecting the lens and shutter assembly with the reentrant section, and a suitable erecting mechanism (not shown) is provided for mounting the lens and shutter assembly so that it, and the bellows, may be folded into the chamber provided by the reentrant section when door 96 is closed.

Rear housing section 90 cooperates with the forward housing section to provide a chamber located behind reentrant section 92 and adapted to contain film assemblage 54 in position for exposure. To permit loading of film assemblage 54 into the camera, rear housing section 90 is pivotally secured to forward housing section 88 at the upper end of the camera housing by such means as a hinge 102. Suitable latch means (not shown) are provided in the lower portion of the housing for retaining the two housing sections together in the operative relation shown. The lower portion of the camera housing is provided with a passage 104 defined by the rear housing section and a lower forward wall section 106, said passage communicating with the exterior of the camera whereby sheet materials, comprising a film assemblage mounted within the housing, can be withdrawn therefrom. The expressions "upper" and "lower" are used herein merely for the purpose of description to indicate the locations of components of the apparatus when the latter is disposed in the position shown, and not in a limiting sense.

Camera 86 includes pressure-applying means for distributing fluid processing composition between the photosensitive and print-receiving sheets of each film unit as the sheets are withdrawn from the camera through passage 104. In the form shown, the pressure-applying means comprise a pair of rigid cylindrical rolls 108 and 110 mounted in juxtaposition with their axes substantially parallel within the lower portion of the housing between passage 104 and the leading (lower) end of film assemblage 54. Roll 108 includes stub shafts 112 projecting from its ends and journaled in a U-shaped support member 114 mounted on rear housing section 90, whereby roll 108 is free to rotate. Roll 110 includes a pair of stub shafts 116 extending from its ends and rotatably journaled in slots 120 in the rearwardly projecting arms of a second support member 118 mounted within the camera housing on the forward housing section. Mounting of pressure-applying rolls 108 and 110 on opposite sections of the camera housing permits the rolls to be spaced apart along with the housing sections, thereby facilitating loading of the camera and particularly threading of the leading end of carrier sheet 78 between the rolls. Roll 110 is mounted for limited movement toward and away from roll 108 and is biased toward roll 108 by a U-shaped spring 122 having arms which engage stub shafts 116.

Pressure-applying rolls 108 and 110, while being spring-biased toward one another, are preferably mounted so that there is a fixed minimum gap between them. This minimum gap between the rolls is preferably approximately equal to the thickness of a film unit in the region of the photosensitive and second sheets between which the processing fluid is to be distributed. By virtue of this construction, as a trailing end section 74 of support sheet 70 and a second portion 78b of carrier sheet 78 move between the pressure-applying rolls following a photosensitive and second sheet, a space may be formed between the sheets in which any excess fluid processing composition, squeezed from between the photosensitive and second sheets, is trapped and retained. Another important function of the gap between the rolls is leaving the film unit free to align itself properly during movement between the rolls prior to spreading of the processing fluid.

Suitable means such as a light-seal roll 104 comprising a resilient, readily deformable material such as sponge rubber, felt and the like, may be provided mounted in passage 104 for closing the passage against the admission of light. Roll 114 is mounted on a U-shaped spring 126 on rear housing section 90 so that roll 114 is free to rotate and to move toward and away from a portion of wall section 106 defining the forward side of passage 104.

Camera 86 comprises means providing an elongated chamber for containing a print-receiving sheet separated from its respective photosensitive sheet to permit exposure of the latter, and means for separating the print-receiving sheet from the photosensitive sheet and guiding the print-receiving sheet in to the chamber. In the form shown, this chamber comprises an elongated, shallow, flexible container in the form of an envelope or bag 128, secured to door 96 and connected at its open end to reentrant section 92 and forward wall section 106 in closing relation to an aperture therein. Container 128 is formed of a flexible material which permits door 96 to be opened and closed and a material which is opaque to actinic light so that light does not enter the camera through the container. Materials suitable for this purpose include fabrics, sheet rubber, organic plastics, and combinations of such materials.

As a means for separating the print-receiving sheet from the remainder of the film assemblage as the print-receiving sheet is drawn in the direction of pressure-applying rolls 108 and 110 through second aperture 68 in forward wall 64 of container 62 and for guiding the print-receiving sheet into envelope 128, there is provided a stripper plate 130 mounted at its ends on a pair of members, one of these members comprising a generally C-shaped mounting member 134 pivotally mounted within the camera housing on forward housing section 88 adjacent the rear of the housing and roll 108. Stripper plate 130 has an operative position (shown in FIG. 7) wherein it is disposed at an angle with respect to the plane of the print-receiving sheets of the film assemblage (and the focal plane of the camera lens) with its rearmost edge portion, designated 132, extending transversely of the film assemblage and located within second aperture 68 against leading end portion 76 of support sheet 70. In this operative position of the stripper plate, as carrier sheet 78 and support sheet 70 are drawn between lips 80 on housing 62 and edge 132 of plate 130, the plate is adapted to project between trailing end section 74 and leading end section 76 of support sheet 70, guiding the print-receiving sheet forwardly into envelope 128.

At least one of the members mounting separator plate 130 comprises, in the form shown, a generally C-shaped mounting member 134 having two arm portions disposed at an acute angle with respect to one another and being pivotally mounted at the juncture of the arm portions on a stud or pin 136. Member 134 includes a first arm portion 138 extending forwardly and upwardly and mounting stripper plate 130 and a second arm portion 140 extending upwardly adjacent the rear of the camera housing and having a forwardly extending projection 142 at its upper end. A spring 144 is provided at stud 134 for biasing member 134 in a clockwise direction so as to urge stripper plate 130 rearwardly into a first position shown in FIG. 7 wherein the stripper plate is operative to guide a print-receiving sheet into envelope 128 and arrest the movement of the sheet.

Stripper plate 130, in its first or operative position, is preferably located substantially parallel with a portion of reentrant section 92 so as to define a relatively narrow passage between the reentrant section and the surface of the stripper plate. As the leading end of a print-receiving sheet enters this passage between the stripper plate and reentrant section 92, the fold in the mask sheet, where leading end section 76 and intermediate section 71 join, engages rear edge portion 132 of the stripper plate as shown in FIG. 6, arresting the movement of the print-receiving sheet with the latter located within flexible envelope 128. Further tension on carrier sheet 78 is not effective to withdraw the print-receiving sheet from the camera, since movement of the print-receiving sheet would require that it bend very sharply around rear edge portion 132, such bending being prevented because of inherent stiffness of the print-receiving sheet and the proximity of the stripper plate to reentrant section 92.

Figure 8:
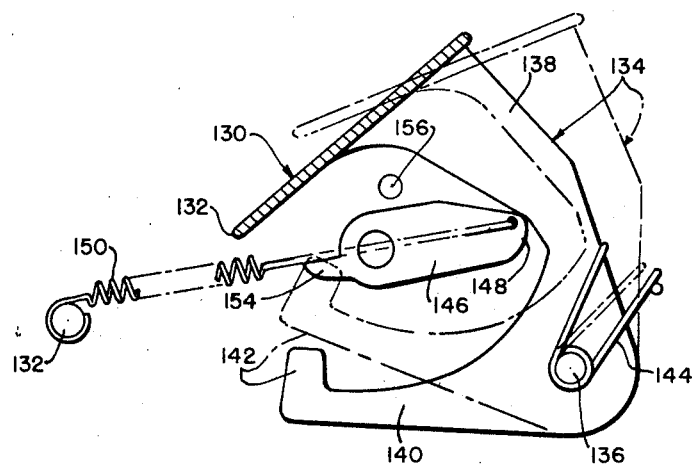

Stripper plate 130 is pivotable from its operative position in a clockwise direction to a third or inoperative position shown in broken lines in FIG. 8, wherein the stripper plate is located forward of its operative position. In this position, a print-receiving sheet can be withdrawn from envelope 128 around edge 132 of the stripper plate and between pressure-applying rolls 108 and 110.

Manually operable control means are provided for retaining stripper plate 130 in operative position and controlling the rotation of stripper plate 130 so as to permit movement of the sheets and return movement of the stripper plate to operative position. This control means includes a control lever 146 pivotally mounted intermediate its ends on a shaft 147 between first and second arm portions 138 and 140 of mounting member 134. Lever 146 includes a first elongated section 148 normally extending rearwardly adjacent projection 142 toward arm portion 140 into a first or operative position shown in FIG. 7 wherein first section 148 engages second arm portion 140 of member 134 for preventing any substantial clockwise rotation of the mounting member from its operative position. Lever 146 includes a relatively short second section 154 and a stud 156 is provided mounted on the forward housing section in the path of movement of the second section of the lever for engaging the second section and preventing clockwise movement of lever 146 past its operative position. Stud 156 also extends into the path of rotation of first arm portion 138 for preventing counterclockwise rotation of mounting member 134 past its operative position. Control lever 146 is pivotable in a clockwise direction to a second or release position for pivoting mounting member 134 in a clockwise direction to a second or release position shown in solid lines in FIG. 8. During pivotal movement of control lever 146 into its second position the end of first section 148 coacts with edge section 158 of arm portion 138 of the mounting member for pivoting the latter into release position. The center of rotation of control member 146 (shaft 147) and the positions of stud 152 and the point of attachment of spring 150 to the control member are so arranged that the spring is moved from one side of the center of rotation of the control member to the other side thereof, during rotation of the control member from its first position (FIG. 7) to its second position (FIG. 8). In this manner, the spring functions to retain the control lever in its second position instead of returning the control lever to its first position, thereby also retaining mounting member 134 and the stripper plate in release position.

In order to withdraw a film assemblage from the camera, the operator pivots control member 146 to release position, manually operable means (not shown) coupled with shaft 147 being provided for this purpose. The operator then grasps the portions of support sheet 70 and carrier sheet 78 projecting from the camera and draws on the two sheets, causing stripper plate 130 and mounting member 134 to pivot to a third position, shown in broken lines in FIG. 8 of the drawings. In this third position of the stripper plate the latter is spaced furthest from reentrant section 92 and container 62 of the film unit to provide space for curving of print-receiving sheet 58 so that it can be drawn around edge portion 132 of the stripper plate between pressure-applying rolls 108 and 110 from the camera. As mounting member 134 is pivoted into its third position, projection 142 coacts with second section 154 of control lever 146, pivoting the control lever in a clockwise direction to a position wherein spring 150 is again operative for pivoting the control lever to its first position. When print-receiving sheet 58 has been withdrawn from bag 128 and from between the stripper plate and reentrant section 92, the stripper plate and mounting member therefor may then return to their first positions under the bias of spring 144, in readiness to engage the print-receiving element of the next successive film unit and guide the latter into bag 128.

Figure 10:
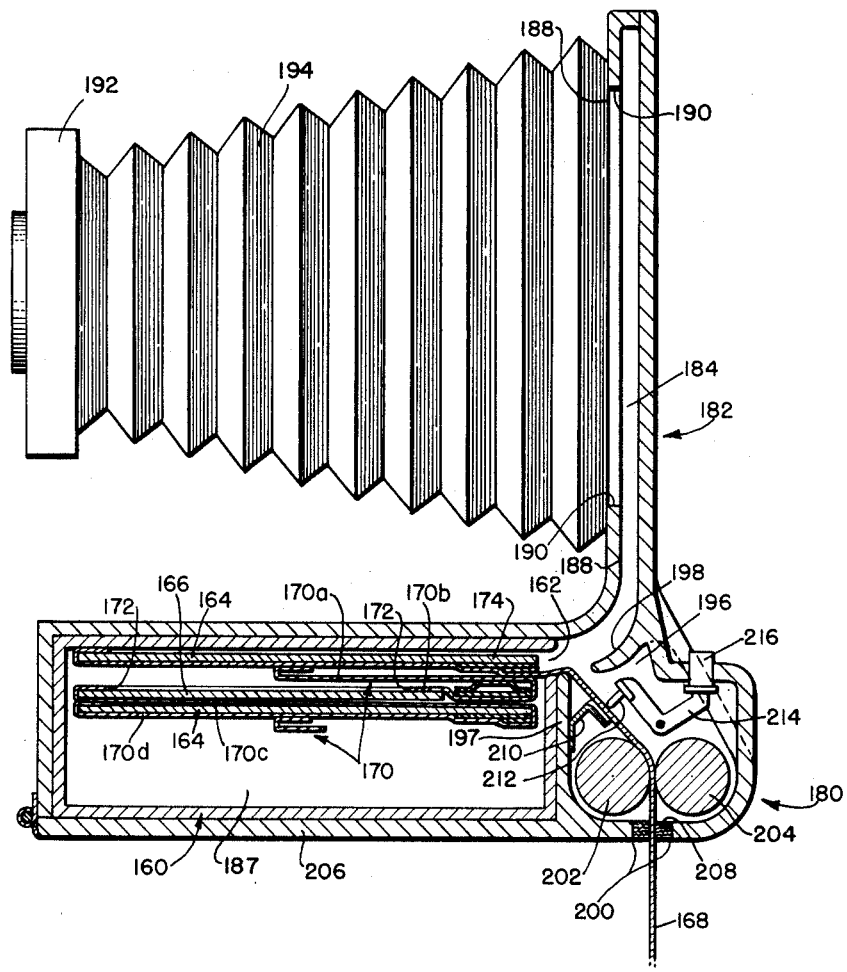
FIG. 10 is a sectional view of another form of camera embodying the invention, the section being taken substantially midway between the sides of the camera.
Figure 11:
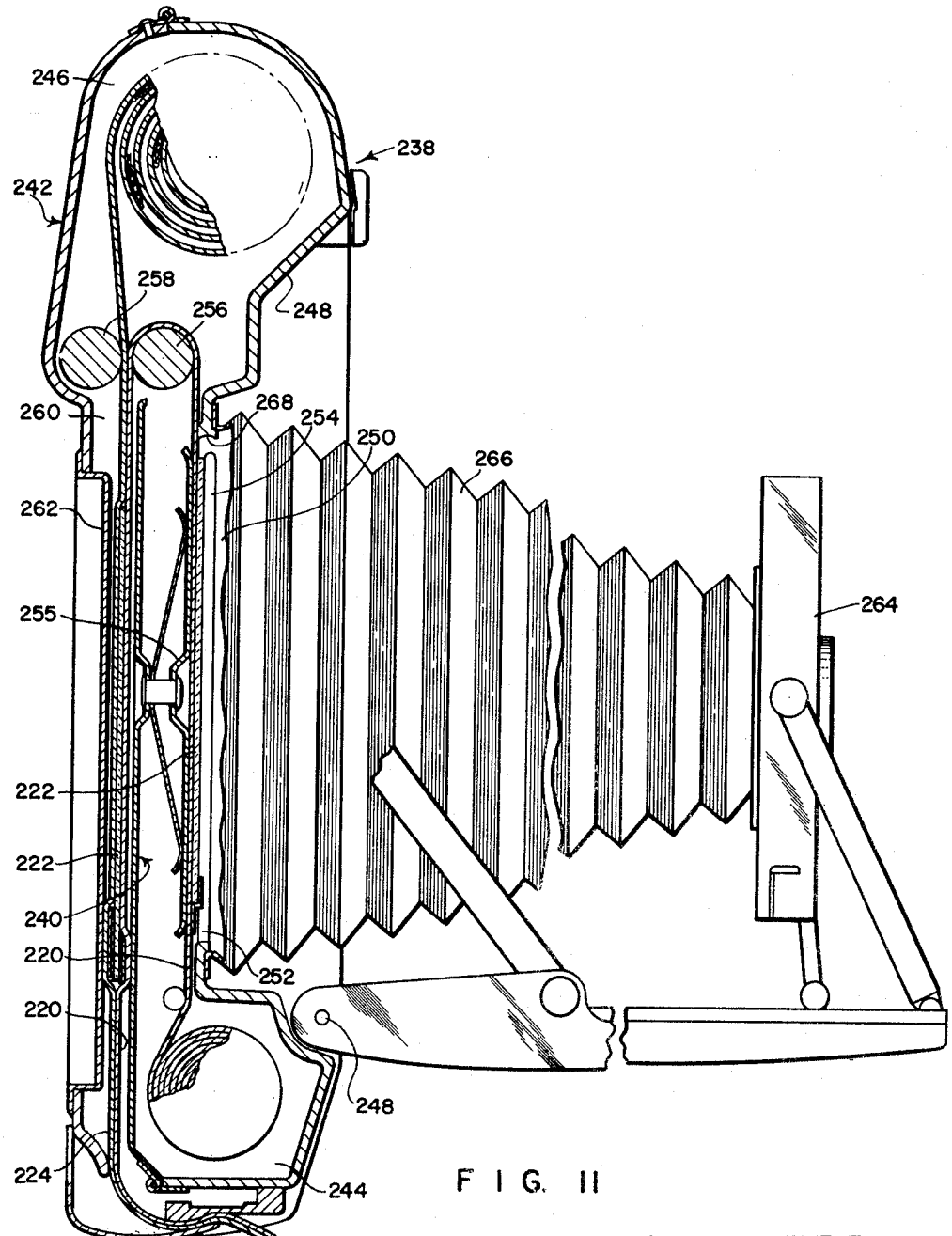
FIG. 11 is a sectional view, similar to FIG. 10, of another embodiment of a camera incorporating the invention.

In the film assemblages and photographic apparatus illustrated heretofore, the second or print-receiving sheet is the sheet which is rotated through approximately 180° with respect to another sheet, from an initial storage position to a processing position. In another form of film assemblage and apparatus illustrated in FIG. 10 of the drawings, it is the photosensitive sheet which is rotated through 180° from an initial storage position to a processing position. This film assemblage, designated 159, comprises a container 160 having a slot 162 at one end through which a series of connected film units, each including a photosensitive sheet 164 and a second sheet 166, may be withdrawn. The photosensitive and second sheets are arranged in overlying stacked relation within container 160 with the trailing ends of the photosensitive sheets located at the end of the assemblage in which slot 162 is located and with the trailing ends of the second sheets located at the opposite end of the assemblage from slot 162. The foremost photosensitive sheet, i.e., the first to be exposed, is located with its trailing end adjacent and in alignment with slot 162 and subsequent second and photosensitive sheets are arranged in alternating order behind the foremost photosensitive sheet. The photosensitive sheets are mounted on a series of connected carrier sheets, the foremost photosensitive sheet being mounted on a first carrier sheet, designated 168, which extends behind the photosensitive sheet and is attached to the front surface thereof, i.e., the surface thereof to be exposed, at the leading end of the photosensitive sheet. A second carrier sheet, designated 170, is joined to the first carrier sheet midway between the ends of the photosensitive sheet and includes a first section 170a extending between the first photosensitive sheet and the first print-receiving sheet toward the trailing end of the photosensitive sheet, a second section 170b extending toward the trailing end of the first print receiving sheet, a third section 170c extending behind the first print-receiving sheet toward the leading end thereof, and a fourth section 170d extending behind the next successive photosensitive sheet toward the leading end thereof where the fourth section is secured to the forward surface of the second photosensitive sheet. The second section of carrier sheet 170 is secured to that surface of the first print-receiving sheet which is superposed with the first photosensitive sheet and is provided with a rectangular aperture defining the area of the print-receiving sheet with which the fluid is spread in contact. A rupturable container 174 of processing fluid is mounted on second section 170b of second carrier sheet 170 adjacent the leading end of print-receiving sheet 166 in position to discharge its contents for spreading between the print-receiving sheet and a photosensitive sheet superposed therewith. The sheet materials, processing fluid, containers, etc., and their composition and construction, comprising film assemblage 159; and the photographic process performed by the film assemblage, may be essentially the same as those described for film unit 10 and/or film assemblage 54. Each photosensitive sheet 164 is also provided with a relatively short trailer sheet 176 at its trailing end adapted to cooperate with the carrier sheet for collecting any excess processing fluid spread from between the trailing ends of the photosensitive sheet and a second sheet superposed therewith during processing of the sheets.

The camera, designated 180, for use with film assemblage 159, comprises a housing having a first section 182 defining an exposure chamber 184 for holding a photosensitive sheet in position for exposure and a second section 186 providing a storage chamber disposed generally at right angles to chamber 184 for holding film assemblage 159. First housing section 182 includes a forward wall 188 having an exposure aperture 190 for admitting light to chamber 184 for exposing a photosensnitive sheet positioned within the chamber across the exposure aperture. The camera includes exposure means in the form of a conventional lens and shutter assembly 192 coupled with first housing section 182 by a bellows 194, the latter providing an enclosed light path between the lens and shutter assembly and the exposure aperture in forward wall 190.

The camera housing includes means providing a third or processing chamber 196 connecting exposure chamber 184 and the storage chamber containing the film assemblage. The storage chamber is separated from the third chamber by a wall 197 providing an opening into the third chamber adjacent one end of the exposure chamber. A guide member 198 is provided in third chamber 196 extending toward the opening in the second chamber 187 for guiding photosensitive sheets from the storage chamber into the first chamber and film assemblage 159 is positioned within the storage chamber with slot 162 in container 160 aligned with the opening in the storage chamber so that, as a photosensitive sheet is withdrawn from the container of the film assemblage trailing end first, the trailing end of the photosensitive sheet extends into engagement with guide member 198. Third chamber 196 is provided with a withdrawal passage 200 in the side thereof opposite first chamber 184 and a pair of juxtaposed pressure-applying rolls 202 and 204 are mounted in third chamber 196 adjacent withdrawal passage 200 for applying compressive pressure to the photosensitive and second elements of each film unit of assemblage 159 as the elements are withdrawn through the third chamber between the pressure-applying rolls. Means are provided in passage 200 for sealing the latter against the admission of light, and this light-sealing means may comprise a resilient material, such as flocking 206, for yieldingly engaging the sheet materials as they are moved through the passage.

Second housing section 186 includes a rear door 206 pivotally connected to the remainder of the housing section adjacent the end thereof opposite the pressure-applying rolls. Pressure-applying roll 202 is mounted, together with dividing wall 208, so that roll 202 may be spaced apart from roll 204 to permit loading of the camera. In order to load the camera, door 206, including wall 208, is opened to allow the film assemblage to be positioned within the second chamber. At the time the film assemblage is loaded into the camera, a portion of first carrier sheet 168, extending from container 160, is threaded through the processing chamber and positioned between the pressure-applying rolls so as to extend through passage 200 when door 206 is pivoted into a closed position. In order to make an exposure, the operator then pulls on the portion of carrier sheet 168 which projects from passage 200, drawing the first photosensitive sheet through slot 162 into engagement with guide member 198 which guides the latter into exposure chamber 184 where the photosensitive sheet is held in position for exposure. To process the exposed photosensitive sheet, the operator again pulls on carrier sheet 168, drawing the photosensitive sheet from chamber 184 around the end of guide member 198 into third chamber 196 into superposition with a print-receiving sheet, drawn at the same time from container 160, to form a sandwich which is drawn between the pressure-applying rolls from the camera.

An indexing device is provided in the camera for arresting the movement of the sheet materials when a photosensitive sheet is positioned for exposure within chamber 184. This indexing device comprises a support member 210 mounted within third chamber 196 for supporting a portion of carrier sheet 168 against an engagement member in the form of a pin 212. To provide for indexing, the carrier sheet is formed with at least one opening, preferably in a margin thereof, into which pin 212 projects for arresting the movement of the carrier sheet when a photosensitive sheet is in position for exposure. Pin 212 is mounted on one end of a generally V-shaped lever 214, pivotally mounted intermediate its ends within chamber 196 and having a push-button 216 projecting from the housing to provide manually engageable means for pivoting lever 214. The lever is spring-biased (in a counterclockwise direction viewing FIG. 10) so as to urge pin 212 against carrier sheet 168 positioned on support member 210. When the operator desires to process a photosensitive sheet following exposure thereof, he merely presses button 216 inwardly to disengage pin 212 from an opening in carrier sheet 168, to allow the carrier sheet to be moved for drawing the exposed photosensitive sheet in superposition with a second sheet between the pressure-applying rolls and for drawing the next successive photosensitive sheet into exposure chamber 184.

As noted above, another basic type of film assemblage takes the form of two rolls or coils; and reference is now made to FIGS. 11 through 14 of the drawings wherein a film assemblage of this type is illustrated together with a camera for employing the film assemblage. The film assemblage comprises a first carrier sheet 220 mounting a sequence of film elements 222 and a second carrier sheet 224 mounting a sequence of rupturable fluid-carrying containers 226. Each film element is of the type adapted to be exposed through one surface and then processed by a fluid distributed against the opposite surface. A film assemblage of this type is shown, for example, in U.S. Patent No. 2,944,894, issued July 12, 1960 to Edwin H. Land, and comprises a photographic screen 228, an image-receiving layer 230, a stripping layer 232 and a photosensitive layer 234, the three layers being carried on the screen in the order stated. The screen may comprise colored filter elements or a lenticular screen, through which light is directed for exposing the photosensitive layer and viewing a transfer image carried by the image-receiving layer. The three layers comprise a unitary element during exposure and processing so that precise registration is maintained between the screen, latent image and transfer image.

Each film element 222 is mounted on first carrier sheet 220 with the photosensitive layer of the film element facing the carrier sheet to allow exposure of the photosensitive layer to be made through the screen and the image-receiving and stripping layers. The film element is secured at a transverse edge to the carrier sheet by a hinge 236 which permits the film element to be pivoted about the edge through 180° with respect to the carrier sheet to bring the screen into facing relation with the carrier sheet and allow the photosensitive layer of the film element to be superposed with the second carrier sheet. Following exposure of the photosensitive element, it is moved from exposure position and it is during this movement from exposure position that the element is pivoted through 180° with respect to the carrier sheet and the photosensitive layer is superposed in face-to-face contact with the second carrier sheet with a rupturable container 226 located between the second carrier sheet and an end edge of the film element and the two carrier sheets. The film element and rupturable container are moved between a pair of pressure-applying members for distributing the processing fluid from the container in a layer 235 between the photosensitive layer and the second carrier sheet to form a sandwich (see FIG. 13) and effect the formation of a transfer image in the image-receiving layer of the film element. Stripping layer 232 of the film element comprises a material soluble in the processing fluid and is weakened by the processing fluid so that, following processing the photosensitive layer can be stripped, together with the second carrier sheet and container, from the film element including the screen and image-receiving layer carrying the transfer image.

The camera for use with this film assemblage is basically the same as the camera illustrated in the aforementioned U.S. Patent No. 2,455,111 and sold by Polaroid Corporation. The camera comprises three housing sections, designated a forward section 238, an intermediate section 240 and a rear section 243, and provides a first storage chamber 244 at one end for the photosensitive materials, in this case a roll of first carrier sheet 220 carrying film elements 222 and a second storage chamber 246 at its opposite end for holding a roll of second carrier sheet 244. The forward housing section includes a forward wall 248 cooperating with intermediate housing section 240 to provide an exposure chamber 250 through which first carrier sheet 220 is guided. Forward wall 248 is provided with an exposure aperture 252 and guide tracks 254 projecting into the exposure aperture from the sides thereof for engaging the margins of film elements 222 and positioning each element for exposure at the focal surface of the lens of the camera. A spring and pressure plate assembly 255 is provided mounted on intermediate section 240 for supporting film elements 222 against guide tracks 254 in position for exposure.

The camera includes a pair of pressure-applying rolls 256 and 258 mounted in juxtaposition within second storage chamber 246 adjacent an opening therein leading to a processing chamber 260 located between intermediate and rear housing sections 240 and 242 behind the exposure chamber. Each film element carried on carrier sheet 220 is drawn, following exposure, from exposure chamber 250 around pressure-applying roll 258 into superposition with second carrier sheet 224 between rolls 256 and 258 into processing chamber 260, wherein the sandwich comprising the two carrier sheets, film element and layer of processing fluid is allowed to remain during a processing period of predetermined duration. Rear housing section 242 is provided with a door 262 at the rear of the processing chamber, which door may be opened at the end of the processing period to permit removal of the processed film element from the camera. To facilitate removal of the film element, second carrier sheet 224 is provided with a scored or precut section which is aligned with each photosensitive element during processing and can be torn readily from the remainder of the second carrier sheet. The structure of the second carrier sheet, in this respect, resembles the structure of the print-receiving sheet shown in the aforementioned U.S. Patent No. 2,579,587. The camera also includes an indexing mechanism for arresting the movement of the sheet materials through the camera when a film element is in position for exposure. For examples of such an indexing mechanism, reference may be had to any of the cameras now being marketed by Polaroid Corporation or to U.S. Patent No. 2,543,159, issued February 27, 1951 in the name of Murry N. Fairbank.

A lens and shutter assembly 264 is provided on the camera connected to forward wall 248 by a conventional folding bellows 266 which cooperates with the forward wall to form exposure chamber 250. Following exposure of a film element and prior to superposition of the film element with the second carrier sheet, the film element is rotated through 180° with respect to the first carrier sheet about the transverse edge of the film element at which the latter is hinged to the carrier sheet. This pivotal movement of the film element occurs during movement of the film element from exposure position into superposition with the second carrier sheet and is effected within the processing chamber defined by bellows 266 and forward wall 248. To effect the pivotal movement of the carrier sheet, forward wall 248 is provided with a guide section 268 positioned in the path of movement of the film element across the focal plane of the camera for engaging the free edge of each film element as it is moved from exposure position toward pressure-applying roll 258 and guiding the film element forwardly within bellows 266 toward the lens and shutter assembly of the camera. The free end of film element 222 is drawn against guide section 269 as the first carrier sheet is drawn past the guide section and continued movement of the first carrier sheet causes the film element to be drawn past the guide section around pressure-applying roll 258 as hinge 236 comes into alignment with the guide section.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for exposing and processing photosensitive sheet materials, said apparatus comprising, in combination, a housing for holding a photographic film assemblage including photosensitive and second sheets movable with respect to one another into superposition with one another and a third sheet for connecting said photosensitive and second sheets and moving said sheets through said apparatus; said housing including means providing a first chamber for holding said third sheet and at least one of said photosensitive and second sheets, a second chamber for holding said one sheet apart from the other of said photosensitive and second sheets during exposure of said photosensitive sheet and a third chamber enclosing means for distributing a processing fluid between said photosensitive and second sheets during movement of said sheets in superposition through said third chamber; means for guiding said one sheet from an initial position in said first chamber, wherein said one sheet is disposed, prior to exposure of said photosensitive sheet, with one surface of said one sheet in facing relation with a surface of said third sheet, into said second chamber; means for guiding said one sheet from said second chamber into superposition with said other of said photosensitive and second sheets in said third chamber; and guide means for engaging said one sheet during movement thereof between said first, second and third chambers and pivoting said one sheet through an angle of 180° with respect to said third sheet about an axis extending transversely of the direction of movement of said sheets to bring the other surface of said one sheet into facing relation with said surface of said third sheet.

2. The photographic apparatus of claim 1, wherein said one sheet positioned within said second chamber comprises said photosensitive sheet and said housing means includes an aperture opening into said second chamber for admitting light to said second chamber to expose said photosensitive sheet.

3. The photographic apparatus of claim 1, wherein said housing means comprises an aperture opening into said first chamber for transmitting light to said first chamber to expose said photosensitive sheet, said second sheet is initially located within said first chamber between said aperture and said photosensitive sheet, and said guide means is constructed for moving said second sheet from said first chamber into said second chamber to permit exposure of said photosensitive sheet within said first chamber.

4. In photographic apparatus for exposing and processing a photographic film assemblage including a photosensitive sheet and a second sheet superposed and coupled with said photosensitive sheet and arranged with one side of said photosensitive sheet facing one side of said second sheet, in combination:

a housing including means for holding said film assemblage in an initial position with said sheets in facing relation prior to exposure of said photosensitive sheet;

means defining a first path along which said film assemblage is movable from said initial position;

guide means located in said first path of movement of said film assemblage for engaging one of said sheets during movement thereof along said first path and guiding said one sheet along a second path into an intermediate position in which said one sheet is pivoted with respect to the other of said sheets apart from said other sheet;

said guide means including means for guiding said one sheet from said intermediate position along a third path into superposition with said other sheet with said one side of said one sheet facing away from said other sheet during movement of said other sheet along said first path; and means located in said first path for distributing a processing liquid within said film assemblage in contact with said photosensitive sheet following superpositioning of said sheets by said means.

5. The photographic apparatus of claim 4 wherein said guide means include means for locating and holding said one sheet in position for exposure at said intermediate position of said one sheet.

6. The photographic apparatus of claim 4 in which means are provided for photoexposing said other sheet when said one sheet is in said intermediate position, and said housing includes means for locating and holding said other sheet in position for exposure at said initial position of said film assemblage.

7. The photographic apparatus of claim 4 in which means are provided for photoexposing said one sheet when said film assemblage is in said initial position, and said housing includes means for locating and holding said one sheet in position for exposure at said initial position of said film assemblage.

8. The photographic apparatus of claim 4 in which said housing includes a first chamber for holding said film assemblage in said initial position, a second chamber for holding said one sheet in said intermediate position, a third chamber enclosing the last-mentioned means for distributing said processing liquid and means for guiding said other sheet along said first path from said first chamber to and through said third chamber; and said guide means are located intermediate said first and third chambers for guiding said one sheet along said second and third paths respectively into and from said second chamber and pivoting said first sheet through 180° with respect to said other sheet about an axis between said first and third chambers.

9. The photographic apparatus of claim 8 in which means are provided for photoexposing said one sheet within said second chamber and for locating said one sheet in proper position for exposure within said second chamber.

10. The photographic apparatus of claim 8 in which means are provided for photoexposing a sheet within said first chamber and for holding said other sheet in position for exposure within said first chamber following movement of said one sheet into said second chamber.

References Cited in the file of this patent
UNITED STATES PATENTS

| | | |
|---|---|---|
| 2,477,324 | Wolff | July 26, 1944 |
| 2,477,304 | Land | July 26, 1949 |
| 2,909,977 | Eburn | Oct. 27, 1959 |